Nov. 25, 1924.  
E. H. PLATT  
1,516,578  
POWER TRANSMISSION FOR MOTOR VEHICLES  
Filed March 9, 1921 3 Sheets-Sheet 1

WITNESS:  
INVENTOR.

Nov. 25, 1924. 1,516,578
E. H. PLATT
POWER TRANSMISSION FOR MOTOR VEHICLES
Filed March 9, 1921 3 Sheets-Sheet 3

WITNESS: INVENTOR.

Patented Nov. 25, 1924.

1,516,578

UNITED STATES PATENT OFFICE.

EDWIN H. PLATT, OF DENVER, COLORADO, ASSIGNOR OF ONE-HALF TO EDWIN F. PLATT, OF PORTLAND, OREGON.

POWER TRANSMISSION FOR MOTOR VEHICLES.

Application filed March 9, 1921. Serial No. 450,943.

*To all whom it may concern:*

Be it known that I, EDWIN H. PLATT, a citizen of the United States, residing at Denver, in the county of Denver and State of Colorado, have invented certain new and useful Improvements in Power Transmissions for Motor Vehicles, of which the following is a specification.

This invention relates to self-propelling vehicle and more particularly to motor driven vehicles of the type commonly known as tractors.

It is an object of my invention to provide in a vehicle of the type referred to, a flexible medium for transmitting the power of the motor to the road wheels, which combines efficiency in operation with simplicity of construction.

Another object of the invention is to arrange a flexible transmission medium with relation to the road wheels of a motor vehicle so that it can function as a track on soft and slippery surfaces.

A further object of the invention is to provide a transmission medium without the necessity of the intermediary of differential or compensating gearing, and still other objects reside in the constructions, arrangements and combinations of parts fully set forth in the following description.

Figure 1:
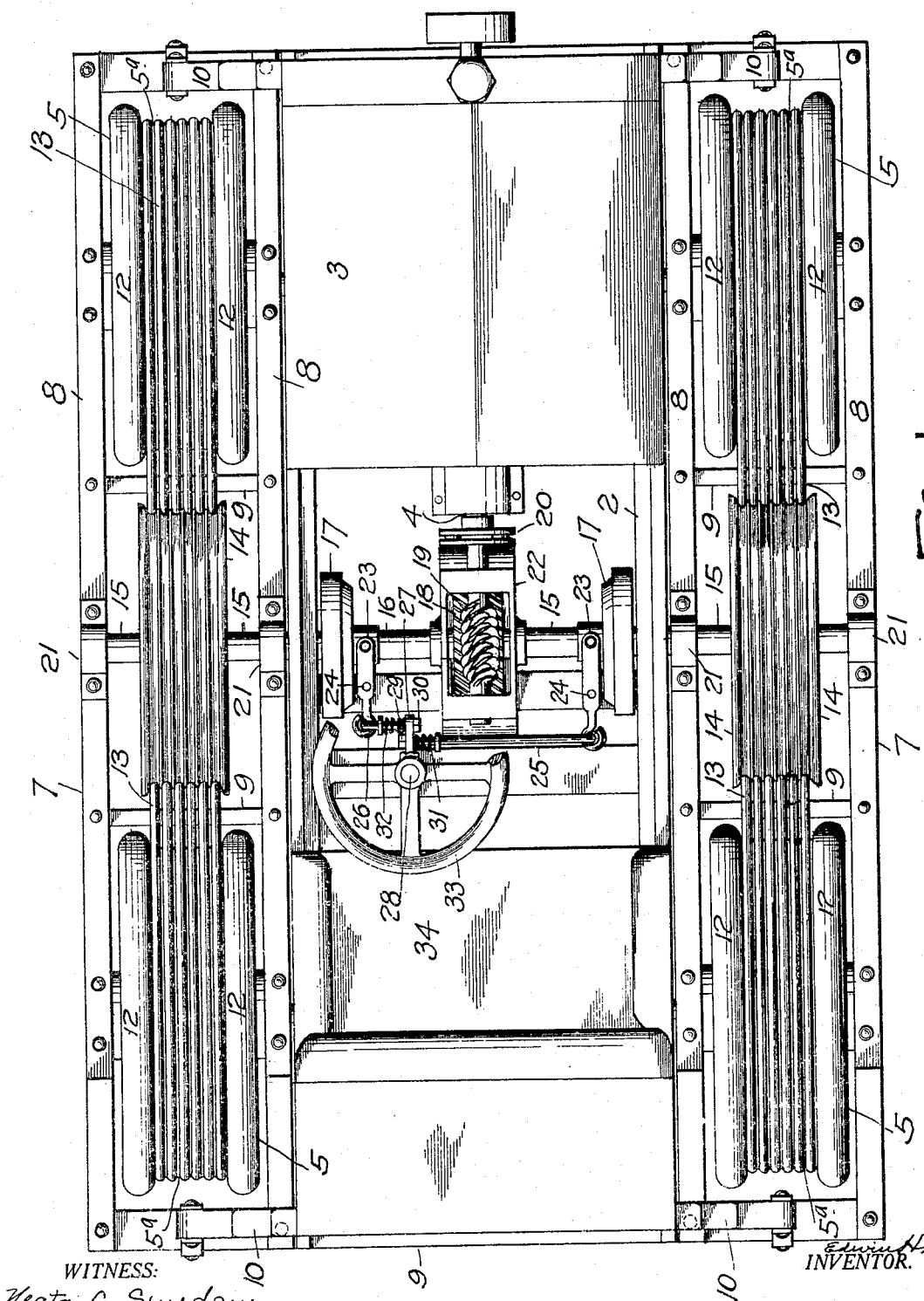
Figure 2:
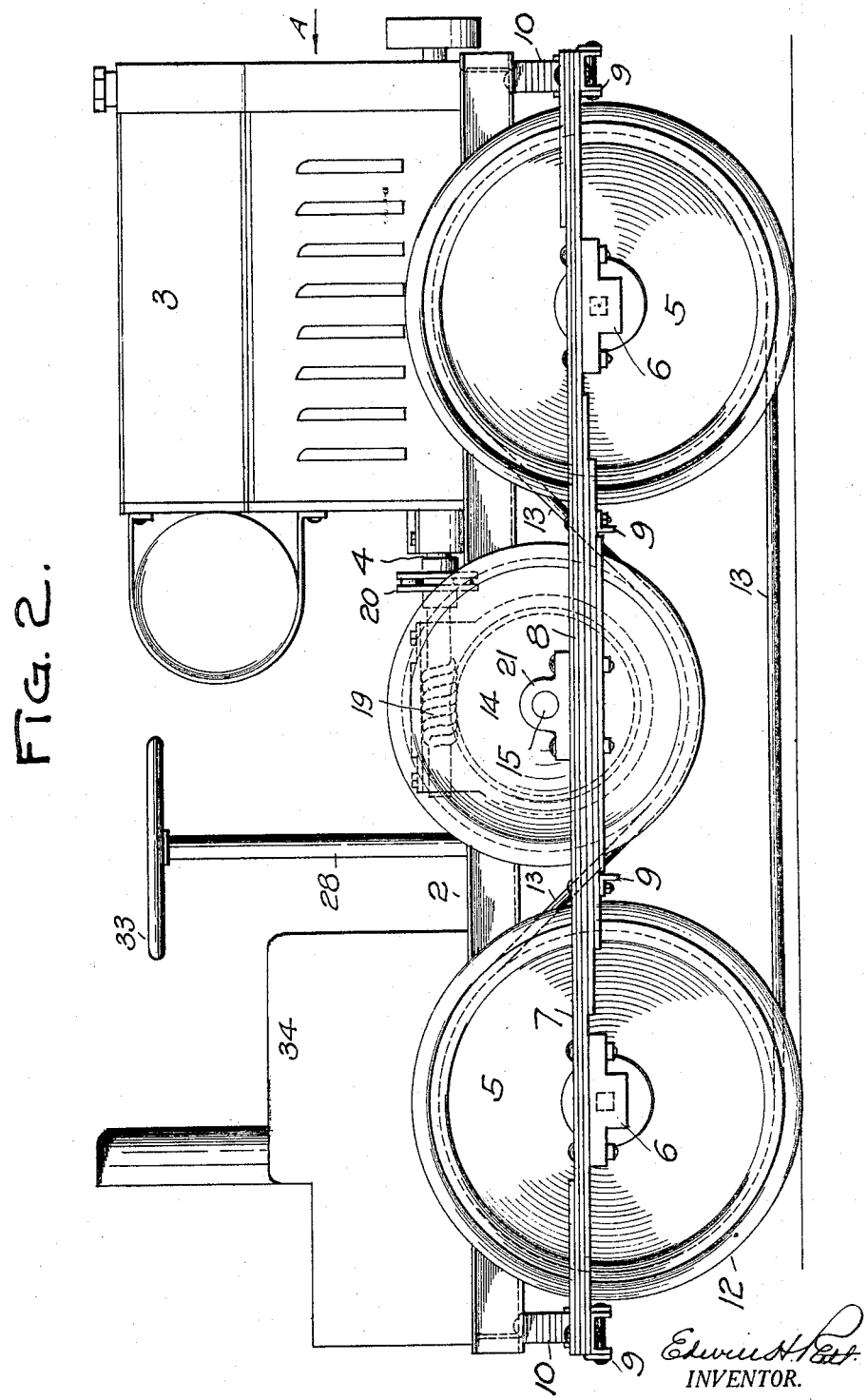

In the accompanying drawings which illustrate an embodiment of my invention in its preferred form, Figure 1 represents a plan view of a tractor to which my invention is applied;

Figure 2, a side elevation of the same, and

Figure 3:
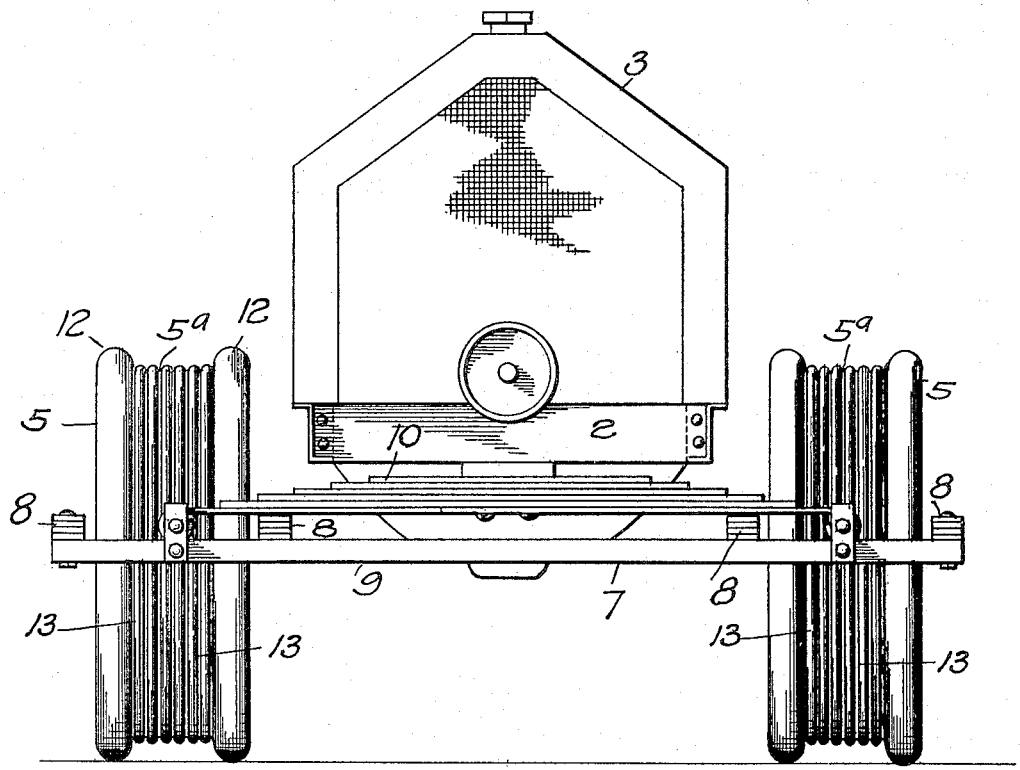

Figure 3, a front elevation looking in the direction of the arrow A, Figure 2.

Referring more specificially to the drawings the reference character 2 designates the chassis of a motor vehicle suitably constructed for the support of the motor and therewith associated parts of the operating mechanism of the same.

The motor which as usual is mounted at the front end of the chassis beneath a protective hood or cover 3, acts upon a power shaft 4 which through the intermediary of the transmission medium of my invention effects the movement of the road wheels 5 upon which the chassis is supported.

The wheels which in the construction shown in the drawings are placed in tandem pairs at opposite sides of the chassis, are rotatably mounted in boxes 6 on a frame 7 which extends beneath the chassis.

It is the main purpose of the under frame to maintain the traction wheels in operative position with relation to each other and the driving mechanism hereinafter to be described, and it is in its preferred form composed of two pairs of parallel leaf springs 8 extending at opposite sides of the road wheels, short cross bars 9 which connect the members of each pair, and transverse leaf springs 10 which are attached at the ends of the pairs of longitudinal springs and are centrally connected to the chassis of the vehicle.

Each of the road wheels has a drum face $5^a$ between treads of larger diameter and it is rotatably supported upon a short shaft which is carried in the before-mentioned boxes 6.

The treads of the wheels are provided by tires 12 which may be made of solid rubber, metal or other suitable material or which may be of the pneumatic type commonly used on vehicles of lighter construction, and attached to the wheel by means of detachable rims or any other convenient method.

The flexible medium through which the mechanical power produced by the motor is transmitted to the road wheels consists of two continuous belts each composed of a' plurality of endless wire ropes 13.

The flexible multiplex belts are placed around the drum faces of the pairs of road wheels at opposite sides of the vehicle and their upper stretches are frictionally engaged by driving wheels 14 mounted at opposite ends of a jack shaft which through the medium of a worm movement is operatively connected with the shaft of the motor.

The peripheral faces of the drum portions of the road wheels and the driving wheels are preferably grooved to separate the endless ropes of the transmission belt and prevent their lateral displacement, and flanges at opposite sides of the driving wheels cooperate with the tires of the road wheels to hold the outer ropes in place.

The jack shaft is preferably composed of three axially alined sections 15 and 16 connected for conjunctive rotation by friction clutches 17, the end sections 15 carrying the driving wheels 14 which engage transmission belts and the middle one 16 supporting the gear wheel 18 of the movement, the worm 19 of which is connected to the motor-shaft through the medium of a flexible joint 20.

The end sections of the shaft which carry the driving wheels are rotatably supported in boxes 21 on the respective pairs of longitudinal springs of the under frame and the middle section to which the worm wheel is connected is mounted in bearings in a casing 22 which encloses the worm movement and which is fastened to a convenient part of the vehicle chassis.

The loose members of the two clutches are connected to bifurcated arms of levers 23 fulcrumed as at 24 upon a fixed part of the chassis.

The opposite arms of the levers have eyes for their pivotal connection with oppositely extending pull rods 25 and 26 which pass loosely through apertures of a crank arm 27 projecting laterally from the steering shaft 28 of the vehicle.

Nuts 29 and 30 at the ends of the rods are engaged by the arm to transmit its rotary movement to the respective levers and springs 31 and 32 between the arms and collars on the rods function to constantly maintain the parts in cooperative relation to each other.

In the operation of my invention the clutches are normally in the position to effect the rotative continuity of the alined sections of the jack shaft and the latter which is rotated by its connection with a shaft of the motor imparts its movement to the driving wheels 14, which bear upon the transmission belts under the influence of part of the weight of the vehicle body and its load.

The frictional contact of the rotating driving wheels with the sagging portions of the belts causes the latter to move longitudinally in the opposite direction and to thereby impart a rotary motion to the road wheels which support the vehicle through the medium of the frame on which they are mounted.

The under frame owing to its inherent resilience and that of its connections with the chassis, absorbs road shocks and increases the frictional contact between the belts and the wheels with which they engage.

The frame furthermore serves to maintain the road wheels and the driving element of the vehicle in their cooperative relation and in practise the body portion of the vehicle and its load against the disturbing and destructive influences of the lateral stresses to which the road wheels are subjected on rutted and uneven surfaces.

The flexible transmission belts also aid in maintaining the chassis and its load in a state of equilibrium and it will be apparent that the impellent action of the driving wheels upon the transmission belts and the driving action of the latter upon the road wheels increase automatically in ratio to the weight of the supported load.

To turn the vehicle in either direction the steering shaft is rotated by a hand wheel 33 at its upper end which is within easy reach of the driver occupying a seat 34 at the rear end of the chassis.

The rotary movement of the steering shaft causes the moving member of the clutch at the inside of the vehicle with relation to the direction in which it is turned, to disengage its correlative member, with the result that the corresponding driving wheel is idle while that at the outside of the vehicle continues its impellent action upon the respective friction belt and thereby causes the vehicle to move in the given direction.

In the event of the tractor being moved onto a surface the rutted or soft condition of which causes the road wheels to sink beyond the depth of their tires, the engagement of the lower stretches of the belt with the ground will cause them to function as endless tracks, which as in tractors of the track-laying type provides the traction of adhesion necessary for the movement of the load.

It will be understood, however, that this occurs only under the above mentioned conditions and that normally when the vehicle is moved over a hard and uneven surface the engagement of the wheel treads keeps the belts at a distance above the same.

It will furthermore be seen that my improved method of transmission greatly increases the leverage by which the power originated in the engine is caused to act upon the traction wheels, mainly by reason of the engagement of the flexible transmission mediums with both the driving and driven wheels at the peripheries thereof.

Having thus described my improved transmission mechanism in a practical and simple form, I desire it understood that variations in the construction and arrangement of the parts thereof may be resorted to within the spirit of the invention as defined in the following claims.

I claim:

1. In a motor vehicle, the combination of tandem traction wheels having drum faces of smaller diameter than their tread circles, endless belts carried on said drum faces, a vehicle body resiliently supported on said wheels, rotary drive wheels on the body frictionally engaging with said belts, and a motor in driving connection with the drive wheels.

2. In a motor vehicle, the combination of tandem traction wheels having drum faces of smaller diameter than their tread circles, endless belts carried on said drum faces, a vehicle body resiliently supported on said wheels, rotary drive wheels on the body supported on the upper stretches of the belts, frictionally engaging with said belts, and a motor in driving connection with the drive wheels.

3. In motor vehicle, the combination of tandem traction wheels having drum faces of smaller diameter than their tread circles, endless belts carried on said drum faces, a vehicle body resiliently supported on said wheels, rotary drive wheels on the body supported in sags of the upper stretches of the belts, and frictionally engaging with said belts, and a motor in driving connection with the drive wheels.

4. In a motor vehicle, the combination of a frame, pairs of tandem traction wheels mounted thereon, said wheels having drum faces of smaller diameter than their tread circles, endless belts carried on said drum faces, a vehicle body resiliently supported on the frame, rotary drive wheels on the body supported on the upper stretches of the belts, and a motor in driving connection with the drive wheels.

5. In a motor vehicle, a frame including resilient side members, pairs of tandem traction wheels mounted on said members, said wheels having drum faces of smaller diameter than their tread circles, a vehicle body resiliently supported on the frame, rotary drive wheels on the body supported on the upper stretches of the belts, and a motor in driving connection with the drive wheels.

6. In a motor vehicle, a frame including resilient side members, pairs of tandem traction wheels mounted on said members, said wheels having drum faces of smaller diameter than their tread circles, a vehicle body resiliently supported on the frame, rotary drive wheels mounted on the body, in connection with the side members of the frame and supported on the upper stretches of the belts, and a motor in driving connection with the drive wheels.

7. In a motor vehicle, tandem traction wheels having drum faces of smaller diameter than their tread circles, endless belts carried on the drum faces, a vehicle body movable with relation to the traction wheels, rotary drive wheels on said body, supported on the upper stretches of the belts, and a motor in driving connection with the drive wheels.

8. In a motor vehicle, tandem traction wheels having drum faces of smaller diameter than their tread circles, endless belts carried on the drum faces, a vehicle body movable with relation to the traction wheels, a rotary driving axle on said body, wheels at opposite ends of the axle supported on the upper stretches of the belts, and a motor in driving connection with the axle.

In testimony whereof I have affixed my signature.

EDWIN H. PLATT.